June 29, 1971   B. A. SZILAGYI   3,589,969
CLAMPING APPARATUS
Filed Jan. 23, 1969
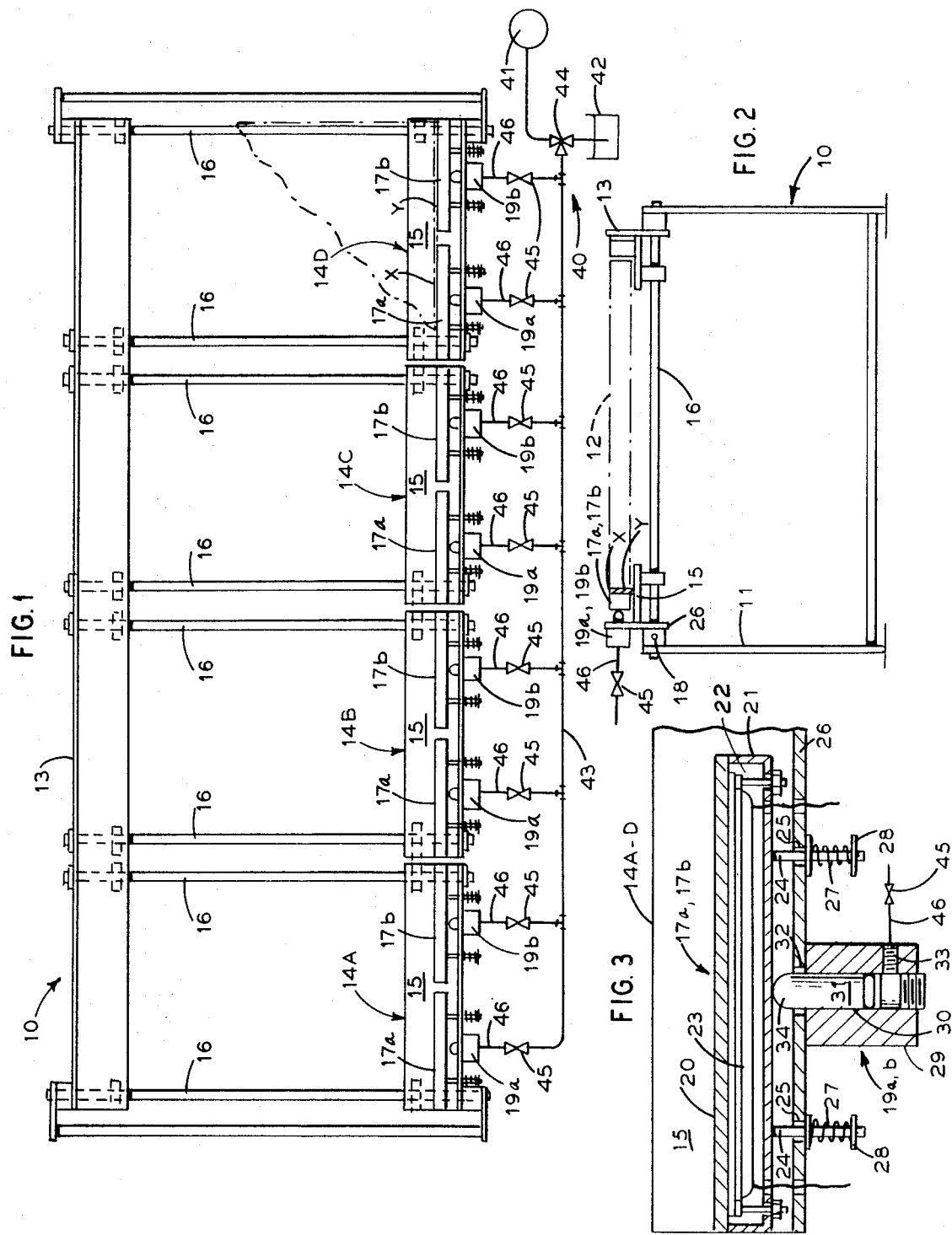
INVENTOR.
BELA A. SZILAGYI
BY
Irving Seidman
ATTORNEY

United States Patent Office 3,589,969
Patented June 29, 1971

3,589,969
CLAMPING APPARATUS
Bela A. Szilagyi, Flushing, N.Y., assignor to Belmotronics, Inc., Long Island City, N.Y.
Filed Jan. 23, 1969, Ser. No. 793,332
Int. Cl. B25b *11/00*
U.S. Cl. 156—556
7 Claims

ABSTRACT OF THE DISCLOSURE

A clamping apparatus for use in laminating a strip of material to the edge of a panel, and having fluid powered platens that are self-aligning with the panel edge and operable to press the strip thereagainst. The platens are moveable in a sequentially staggered order to effect uniform spreading of adhesive compressed between the strip and panel edge.

BACKGROUND AND SUMMARY OF THE INVENTION

This invention relates in general to clamping equipment and more particularly to a clamping apparatus that can be used in connection with laminating strips of material to panel edges.

In the manufacture of doors, table tops, cabinets and similar items, it is often necessary to laminate strips of formica and other materials to the lateral edges of wooden panels. To do this, the panel edge and/or inside face of the strip to be laminated thereto is coated with an adhesive and the strip and intended panel edge are pressed together by means of vise clamps until a satisfactory bond is achieved. With some adhesives, the clamps and/or strip are heated to give a faster or stronger adhesion bond.

One of the problems encountered in the performance of such strip laminating operations is that the panel edges are not always perfectly straight and are sometimes warped slightly. To achieve satisfactory strip bonding, it is desirable that the clamps used apply a uniform pressure over the entire strip area. Even with slightly distorted panel edges, there has been experienced difficulty in applying uniform clamping pressure over the entire strip, and this can not be avoided merely by tightening the clamps since in doing so the panel will be deformed and sometimes damaged.

To avoid these clamping and bonding quality problems of prior art edge-strip lamination techniques, the invention provides a clamping apparatus having fluid powered platens that are self-aligning with the panel edge and are operable to press the strip thereagainst. These platens are moveable in a sequentially staggered order such that they effect uniform spreading of the adhesive compressed between the strip and panel edge.

Essentially, the clamping apparatus of the instant invention includes a base frame adapted to receive and support the individual panels to be worked on, one or more platen units each supported by the base frame in juxtaposed relation to a common edge of the panel, each platen unit itself supporting one or more platen members for self-alignment with the panel edges, and coupled to each platen member is a fluid powered actuator that serves to forcibly move the platen member toward the panel edge to press the strip thereagainst.

To accommodate various sizes of panels, each platen unit has a carriage that is supported by the base frame for movement relative thereto as may be necessary to adjust for different panel sizes. The platen member or members associated with the platen unit are supported by its carriage for limited movement relative thereto by corresponding actuators. This limited movement is enough for performing the strip pressing operations once the carriage has been set for the size panel to be worked upon.

If desired, and according to a preferred embodiment of the invention, heater elements can be connected to the various platen members to heat them to such temperature as will aid in setting the glue used in bonding the strip.

The staggered movement of the platen members can be achieved by using actuators having pistons of different diameters. In this way, for a given common source operating fluid pressure the platen members will move at rates corresponding to the diameters (or effective areas) of their respectively associated actuator pistons. Alternatively, delayed advancement among the various platen members can be achieved by varying the size, and hence the fluid flow resistance through the conduit lines that supply pressurized fluid to the actuators.

The advantage of moving the platen member in a delayed or staggered order is that the adhesive can be better spread out and distributed more uniformly along the length of the strip if it is compressed just along its central length portion and then along its outer length portions.

It is therefore, an object of the invention to provide a clamping apparatus that can be used for laminating strips of material to the edges of panels.

Another object of the invention is to provide a clamping apparatus as aforesaid having platens that are self-aligning with the edge of the panel upon which the strip lamination operation is to be performed.

A further object of the invention is to provide a clamping apparatus as aforesaid featuring means whereby the platens are movable in a sequentially staggered order to effect uniform spreading of adhesive compressed by the action of such platens between the strip and panel edge.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing:

FIG. 1 is a schematic plan view of a clamping apparatus constructed in accordance with preferred embodiment of the invention.

FIG. 2 is an endwise elevation view of the clamping apparatus shown in FIG. 1.

FIG. 3 is a top view, partly in section, of a typical platen unit employed in the clamping apparatus of FIGS. 1 and 2.

DESCRIPTION OF THE PREFERRED EMBODIMENTS OF THE INVENTION

FIGS. 1 and 2 exemplify a clamping apparatus 10 according to the invention as having a base frame 11 adapted to receive and support a panel 12, a fixed platen 13 supported by frame 11 and extending along and against one of the longer edges of panel 12 and a plurality of moveable platen units 14A–D supported frame 11 in juxtaposed relation to the opposite longer edge X of panel 12.

The typical platen unit 14A–D includes an elongated carriage 15 that is supported by and slidably moveable along a pair of guide rails 16 associated with frame 11, and a pair of platen members 17a, 17b supported by carriage 15 for self-alignment with panel edge X. Releaseable locking means 18 are provided on carriage 15 so that it may be shifted along rails 16 and locked thereto at various positions as required to accommodate different sizes of panels 12. For each platen 17a, 17b there is provided a corresponding hydraulically powered actuator 19a, 19b that is supported by carriage 15 for movement therewith, and which is coupled to a respective platen 17a, 17b to forcibly move it in the direction toward panel edge X.

The provision of separate actuators 19a, 19b for the platens 17a, 17b renders the apparatus 10 more suitable for use in laminating a strip Y of material, as for example formica, to the panel edge X, in that the four pairs of platens 17a, 17b associated with platen units 14A–D extend lengthwise in generally parallel relation to cover and bear against corresponding length portions of panel edge X, and by controlling the flow of operating fluid into actuators 19a, 19b, the eight platens 17a, 17b can be moved toward panel edge X in a sequentially staggered order to effect uniform spreading of adhesive compressed between strip Y and panel edge X.

As can be better seen from FIG. 3, the typical platen 17a, 17b has a front plate 20 which presses against the outside of strip Y, and a reinforced back cover 21 joined to plate 20 to define therewith a hollow, box-like enclosure 22 within which can be installed an electric heater element 23 that serves to heat plate 20 to a temperature that expedites the bonding of strip Y to panel edge X.

Extending backward from cover 21 are a pair of studs or pins 24 that are received through oversized holes 25 provided in plate 26 of carriage 15. Over pins 24 are installed respective springs 27 which at one end bear against the back of plate 26 and at the other end bear against retainers 28 secured to pins 24.

The typical actuator 19a, 19b has a body 29 connected to plate 26 for support thereby, a cylinder bore 30, and an output member in the form of a piston 31 slidably mounted in cylinder 30 and extending forwardly therefrom through aperture 32 in plate 26 to engage cover 21 of platen 17a, 17b. When pressurized hydraulic fluid is admitted into cylinder 30 through port 33 in body 29, piston 31 is driven forward and pushes platen 17a, 17b toward panel edge X to press thereagainst the strip Y.

The springs 27 bias the platen 17a, 17b for movement away from panel edge X so that when port 33 is communicated with a low pressure fluid sump, springs 27 force platen 17a, 17b toward a return position spaced apart from panel edge X and strip Y, and in doing so push piston 31 back into cylinder 30 and thereby expels hydraulic fluid through port 33.

According to a preferred embodiment of the invention, the piston 31 is arranged centrally between the spring 27 mount pins 24 and has a spherically curved end surface 34 so that the platen 17a, 17b has a limited tilting movement capability for self-alignment with such length portion of panel edge X as is presented. The angular limits of such tilt movement capability are generally established by the size of plate holes 25 in relation to the diameter of pins 24. The greater the oversize of holes 25 for any given pin 24 size, the greater the angular tilt limits, and vice versa, the angular tilt limits for any particular case being easily determined either graphically or by calculation.

To control the operation of the several actuators 19a, 19b, and hence the movements of their respective platens 17a, 17b there is provided a fluid power distribution system 40 that includes a source 41 of pressurized hydraulic fluid, a low pressure fluid return sump 42, a main fluid distribution conduit line 43, a three way valve 44 capable of selectively communicating main line 43 with either source 41 or sump 42, and a plurality of conduit lines 46 connected to main line 43 through respective shut-off valves 45, the lines 46 each communicating a corresponding actuator 19a, 19b with the source 41 or sump 42 depending upon valves 44 and 45.

In a typical laminating operation, it is desired to operate actuators 19a, 19b such that platen 17b of platen unit 14B and platen 17a of platen unit 14C first advance in unison to press the central length portion of strip Y, then next advance, in unison, platen 17a of platen unit 14B and platen 17b of platen unit 14C, then next advance in unison platen 17b of platen unit 14A and platen 17a of platen unit 14D, and then finally advance in unison platen 17a of platen unit 14A and platen 17b of platen unit 14D.

As can be appreciated by the artisan, the foregoing four stages of platen advancement tend to spread out the adhesive used for binding strip Y and panel edge X from the center thereof to the opposite ends thereof.

The staggered order of platen advancement can be achieved in either one of two ways. One way is to provide different size pistons 31 in the different actuators 19a, 19b, such that for a given source 41 pressure, the platens will advance at rates corresponding to the diameters (or effective areas) of their respectively associated pistons 31. Alternatively, the fluid flow resistances from main line 43 to cylinder ports 33 can be varied among the several actuators 19a, 19b in accordance with the desired preselected platen speeds. Such flow resistance variation can be achieved by using different size conduit lines 46 and/or changing the settings of the individual valves 45.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A clamping apparatus which comprises a base means adapted to receive and support a panel; a plurality of platen units supported by said base means in juxtaposed relation to an edge of such panel, each platen unit including a carriage supported by said base means for movement relative thereto, a platen member moveable relative to said panel edge to press thereagainst a strip of material to be laminated thereto, and a fluid powered actuator coupled to said platen member to forcibly move same toward said panel edge to press said strip thereagainst, said carriage having a plurality of oversize passages and said platen member having a plurality of pins extending into corresponding oversize passages of the carriage to support the platen member for movement relative to said carriage and for self-alignment with the panel edge.

2. A clamping apparatus according to claim 1 including fluid power distribution means connected to each of said actuators and operable to deliver thereto pressurized fluid at predetermined rates to move the platen members associated with said actuators and platen units at respectively corresponding rates.

3. A clamping apparatus according to claim 1 wherein said actuator is supported by said carriage for movement therewith.

4. A clamping apparatus according to claim 1 including heater means connected to said platen member to heat same for aiding the lamination of said strip to the panel edge.

5. A clamping apparatus according to claim 1 wherein said actuator is supported by the carriage and has an output member moveable relative to said carriage to advance and platen member in a direction toward said panel edge, said output member having a curved surface positioned for engagement with the platen member to advance same and to accommodate limited tilting movement of said platen member for self-alignment with the panel edge.

6. A clamping apparatus according to claim 1 including spring means disposed to bias said platen member for movement away from the panel edge toward a return position spaced-apart therefrom.

7. A clamping apparatus according to claim 2 wherein said fluid power distribution means includes a source of pressurized fluid and a plurality of conduit lines each communicating a corresponding actuator with said fluid source, and said actuators have pistons with areas corresponding respectively in value to predetermined platen member speeds for a given total fluid flow rate from said source.

References Cited

UNITED STATES PATENTS

| | | | |
|---|---|---|---|
| 856,416 | 6/1907 | McLarty. | |
| 2,526,342 | 10/1950 | Frisch | 269—26X |
| 3,067,309 | 12/1962 | Chinn | 100—237X |

FOREIGN PATENTS 606,232  1960  Italy.

ANDREW R. JUHASZ, Primary Examiner

D. D. EVENSON, Assistant Examiner

U.S. Cl. X.R.

269—24